United States Patent
Tan et al.

(10) Patent No.: US 9,643,842 B2
(45) Date of Patent: May 9, 2017

(54) NANOARCHITECTURED MULTI-COMPONENT ELECTRODE MATERIALS AND METHODS OF MAKING THE SAME

(75) Inventors: Bing Tan, Ann Arbor, MI (US); Zhendong Hu, Ann Arbor, MI (US); Yong Che, Ann Arbor, MI (US)

(73) Assignee: IMRA AMERICA, INC., Ann Arbor, MI (US)

( * ) Notice: Subject to any disclaimer, the term of this patent is extended or adjusted under 35 U.S.C. 154(b) by 1300 days.

(21) Appl. No.: 13/047,242

(22) Filed: Mar. 14, 2011

(65) Prior Publication Data

US 2012/0237828 A1    Sep. 20, 2012

(51) Int. Cl.
*H01M 4/00* (2006.01)
*B82Y 30/00* (2011.01)
(Continued)

(52) U.S. Cl.
CPC .............. *B82Y 30/00* (2013.01); *H01B 1/04* (2013.01); *H01B 1/08* (2013.01); *H01M 4/366* (2013.01);
(Continued)

(58) Field of Classification Search
CPC .......... H01M 4/52; H01M 4/04; H01M 4/485; B05D 3/02; B05D 5/00; H01B 1/02; H01B 1/04; H01B 1/12; B82Y 30/00
(Continued)

(56) References Cited

U.S. PATENT DOCUMENTS 6,346,348 B1   2/2002  Nakajima et al.
6,391,496 B1 *  5/2002  Nakajima ................ C01G 9/00
                                                429/231.1
(Continued)

FOREIGN PATENT DOCUMENTS

JP    2000-277113    10/2000
JP    2005-228706    8/2005
(Continued)

OTHER PUBLICATIONS

Carbon/MoO2 Composite Based on Porous Semi-Graphitized Nanorod Assemblies from In Situ Reaction of Tri-Block Polymers Xiulei Ji, P. Subramanya Herle, Youngho Rho, and L. F. Nazar Department of Chemistry, University of Waterloo, Waterloo, Ontario, Canada N2L 3G1 Received Apr. 25, 2006. Revised Manuscript Received Nov. 4, 2006.*
(Continued)

*Primary Examiner* — Gary Harris
(74) *Attorney, Agent, or Firm* — Sughrue Mion, PLLC; Richard C. Turner

(57) ABSTRACT

At least one embodiment of the present invention provides preparation methods and compositions for nanoarchitectured multi-component materials based on carbon-coated iron-molybdenum mixed oxide as the electrode material for energy storage devices. A sol-gel process containing soluble organics is a preferred method. The soluble organics could become a carbon coating for the mixed oxide after thermal decomposition. The existence of the carbon coating provides the mixed oxide with an advantage in cycling stability over the corresponding carbon-free mixed oxide. For the carbon-coated mixed oxide, a stable cycling stability at high charge/discharge rate (3A/g) can be obtained with Mo/Fe molar ratios ≥1/3. The cycling stability and rate capability could be tuned by incorporating a structural additive such as $Al_2O_3$ and a conductive additive such as carbon nanotubes. The
(Continued)

high rate performance of the multi-component material has been demonstrated in a full device with porous carbons as the positive electrode material.

19 Claims, 11 Drawing Sheets

(51) Int. Cl.
      *H01B 1/04*       (2006.01)
      *H01B 1/08*       (2006.01)
      *H01M 4/36*      (2006.01)
      *H01M 4/48*      (2010.01)
      *H01M 4/485*     (2010.01)
      *H01M 4/58*      (2010.01)
      *H01M 4/587*     (2010.01)
      *H01M 4/62*      (2006.01)

(52) U.S. Cl.
    CPC .............. *H01M 4/48* (2013.01); *H01M 4/483* (2013.01); *H01M 4/485* (2013.01); *H01M 4/58* (2013.01); *H01M 4/587* (2013.01); *H01M 4/62* (2013.01); *H01M 4/624* (2013.01)

(58) Field of Classification Search
    USPC ...... 429/221; 977/734, 742, 773; 252/182.1, 252/506; 427/122
    See application file for complete search history.

(56) References Cited

U.S. PATENT DOCUMENTS

| | | | |
|---|---|---|---|
| 2006/0060827 | A1 | 3/2006 | Ravet et al. |
| 2008/0138709 | A1* | 6/2008 | Hatta .................... H01M 4/364 429/221 |
| 2008/0160409 | A1* | 7/2008 | Ishida et al. ................. 429/220 |
| 2009/0297947 | A1 | 12/2009 | Deng et al. |
| 2010/0159334 | A1 | 6/2010 | Kashima et al. |
| 2010/0176337 | A1 | 7/2010 | Zhamu et al. |
| 2010/0254886 | A1* | 10/2010 | McElrath et al. ......... 423/447.2 |
| 2010/0266899 | A1 | 10/2010 | Barker et al. |

FOREIGN PATENT DOCUMENTS

| | | |
|---|---|---|
| JP | 2007-500421 | 1/2007 |
| JP | 2007-520038 | 7/2007 |
| JP | 2008-257894 | 10/2008 |
| JP | 2008-542979 | 11/2008 |
| JP | 2011-529257 | 12/2011 |
| WO | 2004/068620 | 8/2004 |
| WO | 2006/120332 A2 | 11/2006 |

OTHER PUBLICATIONS

International Search Report dated Nov. 16, 2006 issued in International Application No. PCT/US2010/028184.
T. Senoh et al. Lithium Insertion to Iron-Substituted Molybdenum Trioxide,. Denki Kagaku Oyobi Kogyo Butsuri Kagaku, issue 9, vol. 62, 1994, pp. 858-862.
Li Chun et al., "Hematite nanoflakes as anode electrode materials for rechargeable lithium-ion batteries", Electrochimica Acta, 2010, pp. 3089-3092, vol. 55.
Xiulei Ji et al, "Carbon/$MoO_2$ Composite Based on Porous Semi-Graphitized Nanorod Assemblies from In Situ Reaction of Tri-Block Polymers", Chemical Materials, 2007, pp. 374-383, vol. 19.
Dominique Larcher et al, "Recent findings and prospects in the field of pure metals as negative electrodes for Li-ion batteries", Journal of Materials Chemistry, 2007, pp. 3759-3772, vol. 17.
Seung Woo Lee, et al., "High-power lithium batteries from functionalized carbon-nanotube electrodes", Nature Nanotechnology DOI:10.1038/NNANO.2010.116 Published online Jun. 20, 2010, pp. 1-7.
Se-Hee Lee, et al., "Metal oxide nanoparticles for advanced energy applications", Thin Solid Films, 2009, pp. 3591-3595, vol. 517.
Se-Hee Lee, et al, "Reversible Lithium-Ion Insertion in Molybdenum Oxide Nanoparticles", Advanced Materials, 2008, pp. 3627-3632, vol. 20.
N. N. Leyzerovich, et al., "Electrochemical intercalation of lithium in ternary metal molybdates $MMoO_4$ (M: Cu, Zn, Ni and Fe)", Journal of Power Sources, 2004, pp. 76-84, vol. 127.
Yongguang Liang, et al., "Low temperature synthesis of a stable $MoO_2$ as suitable anode materials for lithium batteries", Materials Science and Engineering B, 2005, pp. 152-155, vol. 121.
Yanna Nuli, et al., "Synthesis and characterization of Sb/CNT and Bi/CNT composites as anode materials for lithium-ion batteries", Materials Letters, 2008, pp. 2096-2099, vol. 62.
P. Poizot, et al., "Nano-sized transition-metal oxides as negative-electrode materials for lithium-ion batteries", Nature, Sep. 28, 2000, pp. 496-499, vol. 407.
Yifeng Shi, et al., "Ordered Mesoporous Metallic $MoO_2$ Materials with Highly reversible Lithium Storage Capacity", Nano Letters, 2009, pp. 4215-4220, vol. 9, No. 12.
Zhiyu Wang et al., "One-pot synthesis of uniform carbon-coated $MoO_2$ nanospheres for high-rate reversible lithium storage," Chemical Communications, 2010, pp. 6906-6908, vol. 46.
M. Stanley Whittingham, "Lithium Batteries and Cathode Materials," Chemical Review, 2004, pp. 4271-4301, vol. 104.
Guoxiu Wang, et al., "Sn/graphene nanocomposite with 3D architecture for enhanced reversible lithium storage in lithium ion batteries", Journal of Materials Chemistry, 2009, pp. 8378-8384, vol. 19.
Mao-Sung Wu, et al., "Electrodeposition of iron oxide nanorods on carbon nanofiber scaffolds as an anode material for lithium-ion batteries," Electrochemica Acta, 2010, pp. 3240-3244, vol. 55.
Lei Zheng, et al., "Well-aligned molybdenum oxide nanorods on metal substrates: solution-based synthesis and their electrochemical capacitor application," Journal of Materials Chemistry, 2010, pp. 7135-7143, vol. 20.
Chun-Ling Zhu, et al., "High capacity and good cycling stability of multi-walled carbon nanotube/$SnO_2$ core-shell structures as anode materials of lithium-ion batteries", Materials Research Bulletin, 2010, pp. 437-441, vol. 45.
Response to Chinese Office Action issued in counterpart Chinese Application No. 201180058094.2 (dated Sep. 22, 2015).
English translation of Japanese Office Action issued Nov. 4, 2015 by the Japanese Patent Office in counterpart Japanese Application No. JP 2013-541993.
Communication from the Japanese Patent Office issued Dec. 16, 2015 in counterpart Japanese Application No. 2013-558060.

* cited by examiner

NANOARCHITECTURED MULTI-COMPONENT ELECTRODE MATERIALS AND METHODS OF MAKING THE SAME

FIELD OF INVENTION

This invention relates to energy storage devices. More specifically, the present invention relates to a nanoarchitectured electrode material that comprises multi nanoscaled components.

BACKGROUND OF INVENTION

Batteries and electrochemical capacitors represent important systems for energy storage, with applications in electronics, electric vehicles, telephone communication systems, power supplies, and many other applications.

Batteries and electrochemical capacitors based on lithium chemistry have attracted considerable attention as the new generation of energy storage device because of advantages in energy densities and cycle life. During charging, lithium ions are extracted from the positive electrode (cathode) and inserted into the negative electrode (anode) in a lithium ion battery. During discharge, these ions are extracted from the negative electrode (anode) and inserted into the positive electrode (cathode). Materials used for the negative electrode generally include carbonaceous materials, metals, semi-metals, metal oxides, metal sulfides, and metal nitrides. Among them, metal oxides are attractive because of their high specific capacity, good stability in air, and relatively low cost. Among the oxides, iron oxides are particularly interesting because of their high specific capacities (theoretical specific capacity for $Fe_2O_3$: 1007 mAh/g), non-toxicity, low cost (price of iron: less than $1/lb in general), and abundance. Electrodes based on iron oxides, however, generally have poor cycling stability resulting from the large volume expansion/contraction during the lithium insertion/extraction cycling process. Moreover, the main lithium extraction potential for iron oxides is relatively high (~1.7 V vs. Li/Li$^+$), which will limit the output voltage of a full cell. On the other hand, molybdenum oxides are also non-toxic. They may offer better cycling stability and relatively lower lithium-extraction potential than iron oxides. Molybdenum oxides, however, are relatively more costly (price of Mo: over $30/lb in general) and they have a relatively slow lithium insertion/extraction rate limiting their rate capability (M. Stanley Whittingham, 2004). The mixture of iron oxide and molybdenum oxide will be interesting as an electrode material with advantages in good cycling stability, relatively low materials cost, relatively low lithium-extraction potential, and good safety. The presence of iron will lower the materials cost, while molybdenum will improve the mixed materials' cycling stability. Conventional iron-molybdenum mixed oxides have shown poor cycling stabilities, which has limited their applications as electrode materials for energy storage devices.

Therefore, there is a need for developing an iron-molybdenum oxide-based electrode material with good cycling stability. Since the electrode material will be used for commercial devices, it is important that the preparation process can be scaled up with relatively low cost. Therefore, there is also a need for preparing the electrode material by using a wet-chemistry process, which may offer a lower production cost than the conventional chemical vapor deposition and hydrothermal processes that have been used to prepare $MoO_3$ and $Fe_3O_4$.

SUMMARY OF THE INVENTION

An object of the present invention, therefore, is to develop electrode materials based on iron and molybdenum mixed oxides that have high specific capacity and good cycling stability by using a relatively low-cost preparation process.

The object has been achieved by preparing nanoarchitectured multi-component materials comprising carbon-coated iron-molybdenum mixed oxide as electrode materials. These materials have shown good cycling stability, high specific capacity, and good rate capability. By introducing carbon coating and controlling the Mo/Fe molar ratio, the nanostructured multi-component materials have shown much better cycling stability and rate capability than conventional iron-molybdenum mixed oxides. The electrochemical performance of the multi-component materials could be further tuned or improved by incorporating a structural/conductive additive.

Although it is not necessary to the practice of embodiments of the present invention to understand the underlying operative mechanism, and without subscribing to any particular theory, the improvement in cycling stability and rate capability may be because of a synergetic interaction among iron oxide, molybdenum oxide, the carbon coating, a structural additive, and/or a conductive additive of nano- or molecular-scale during the charge/discharge cycling process. The instability of an electrode material particularly for the negative electrode material is generally caused by the large volume expansion/contraction of the electro-active particles during the cycling process. The volume change may crack the electro-active particles, resulting in the loss of electrical contact among the cracked particles and between the cracked particles and the current collector. Since a larger particle generally is easier than a smaller particle to be cracked during the volume expansion/contraction process, a nanoscaled particle size is preferred for maintaining the integrity of the particles during the volume expansion/contraction process. Moreover, a nanoscaled particle size is also preferred for achieving high rate capability since the lithium diffusion distance will be shorter in a smaller particle.

The volume expansion/contraction of one oxide may be different from that of another oxide at the same voltage because the required lithium insertion/extraction energy is generally different among all materials. For the mixed oxide, the magnitude of the volume expansion/contraction of iron oxide is different as compared to that of molybdenum oxide at the same voltage. A mixture of iron oxide and molybdenum oxide may reduce the possibility of abrupt volume change during the cycling process, which may help maintain the integrity of the film. In other words, iron oxide and molybdenum oxide may act as a stress buffer layer for each other during the cycling process.

The presence of carbon coating among the particles is also very helpful for achieving good cycling stability. Electro-active nanoscaled particles may merge into larger particles during the volume expansion process and then the larger particles will be more easily cracked during the cycling process. The existence of a carbon coating may prevent the nanoparticles from merging together to form lager particles so that the risk for generating cracked particles could be reduced. Moreover, a carbonaceous material generally has a good electrical conductivity. A carbon coating can ensure the electric connection among carbon-coated particles, which may improve the cycling stability of the electro-active particles.

The volume expansion/contraction stress generated by the transition metal oxides can be further reduced by incorporating a structural additive that experiences insignificant volume change during the cycling process. These additives may comprise electro-inert materials such as aluminum oxide and/or silicon dioxide and electro-active materials such as graphene and carbon nanotubes. These structural additives will help maintain the original size and position of the electro-active particles during the cycling process so that stable cycling performance can be achieved.

The high rate performance of the present nanoarchitectured carbon-coated iron and molybdenum mixed oxide can be improved by incorporating a conductive additive with good electric conductivity. The conductive additive will improve the rate of electrons reaching or being released from individual electro-active particles. The electrically conductive additive should experience little volume change during the cycling process; otherwise it may reduce the cycling stability of the electrode material.

For an electrode material with good cycling stability and rate capability, it is preferred that each of the components be composed of particles of nanoscaled size so that large interactions among the components could be realized. A homogeneous mixing at the nanoscale among all components is also preferred to maximize the synergetic interactions among the components. In other words, components in a multi-component electrode material are preferred to be architectured or constructed at nanoscale so that intimate interactions among the components can be realized.

Nanoarchitecturing of the present multi-component electrode materials has been realized by preparing these electrode materials through a wet chemistry process. Specifically, a sol-gel process is developed to ensure the generation of nanoscaled particle sizes, a homogenous mixture among all components, and a relatively low cost for large scale production.

The sol-gel process employs the use of relatively inexpensive salts and solvents. This process does not need a washing step, which normally is used to remove inorganic impurities such as alkaline metal ions ($Na^+$ for example) in a co-precipitation process when an alkaline metal hydroxide is used as the precipitation agent. The lack of a purification step is expected to further lower the production cost of the multi-component materials.

For purposes of summarizing the present invention, certain aspects, advantages and novel features of the present invention are described herein. It is to be understood, however, that all such advantages are not necessarily achieved in accordance with any particular embodiment Thus, the present invention may be embodied or carried out in a manner that achieves one or more advantages without necessarily achieving other advantages as may be taught or suggested herein.

DETAILED DESCRIPTION

Figure 1:
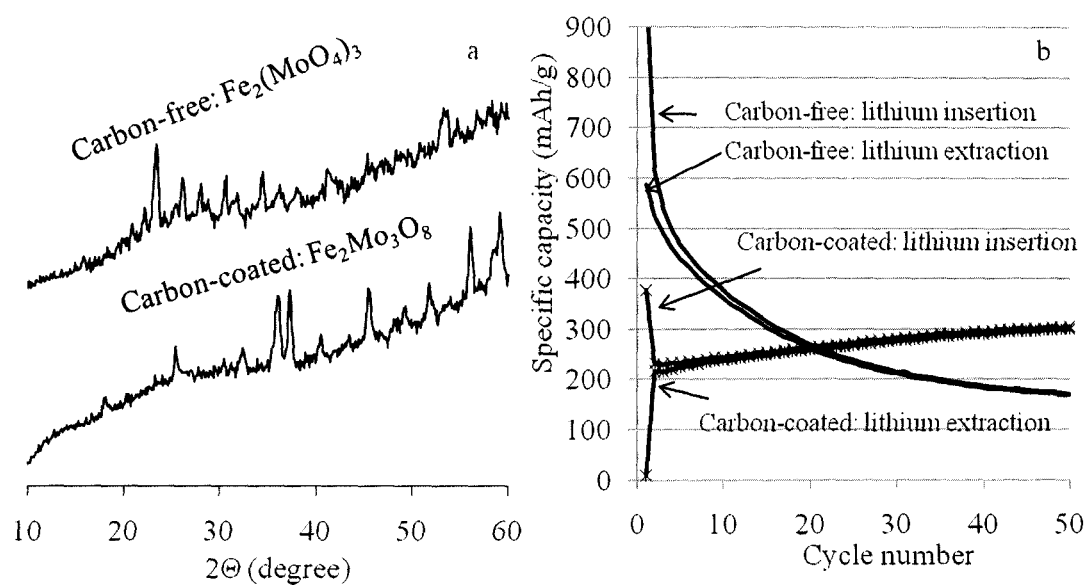
FIG. 1 illustrates: (a) XRD patterns and (b) cycling stability at 3 A/g charge/discharge rate for the carbon-coated $Fe_2Mo_3O_x$ (750° C. in Ar) and the carbon-free $Fe_2Mo_3O_x$ (550° C. in air).

For energy storage devices such as lithium ion capacitors and lithium ion batteries, the instability of a negative electrode generally is caused by the large volume expansion/contraction of electro-active particles during the cycling process. The volume change may crack the electro-active particles resulting in the loss of electric contact among the cracked particles and between the cracked particles and the current collector. The volume change stress could be released by incorporating a structural additive into the electrode material. The structural additive experiences insignificant volume/shape change during the cycling process.

Such structural additives are electro-active materials such as carbonaceous materials comprising amorphous and crystalline carbons and electro-inert materials such as $Al_2O_3$ and $SiO_2$.

The incorporation of a structural additive, however, does not necessarily result in good cycling stability for an electrode material. For example, electrodes fabricated from conventional iron-molybdenum mixed oxides lacked good cycling stability even when they were mixed with carbon black during the electrode fabrication process. It is standard practice in an electrode fabrication process that an electrode material was mechanically mixed with a carbon black to form an electrode film. The purpose of adding carbon black is to ensure the electrical conductivity of the electrode film. The carbon incorporated in this process, however, is not expected to effectively act as stress buffer layer for the individual oxide particles. Both the oxide and the carbon black generally are composed of large aggregates of particles particularly when the oxide comprises nanoparticles. Individual oxide particles are not expected to be effectively covered with a thin layer of carbon black particles since the nanoparticle aggregates from either oxide or carbon black are not likely to be broken into well-separated individual particles through mechanical mixing. One of the most effective ways to cover the oxide particles with carbon is to coat the particles in-situ through a wet chemistry process before the formation of aggregates. Specifically, oxide particles need to be surrounded with organic molecules during the synthesis process before they grow larger and become aggregated during the drying and heating process. These organic molecules will become a layer of carbon coating at the surfaces of the particles after thermal decomposition. Another advantage for in-situ carbon coating is that the organic molecules will limit the particles growth during the heating process, which carbonizes the organic molecules and removes water from the particles. The in-situ prepared carbon coating limits the nanoparticles from merging into larger particles during the lithium insertion process and releases the volume change stress generated by the mixed oxide nanoparticles effectively, thus a significant improvement in the cycling stability is obtained.

Based on the carbon-coating mechanism discussed above, multi-component materials based on the carbon-coated nanostructured iron-molybdenum mixed oxide were prepared through a wet chemistry process. It was found that the in-situ carbon coating did greatly improve the cycling stability of the mixed oxide. Interestingly, it was revealed that the cycling stability was also affected by the molar ratio of Mo/Fe. The carbon-coated iron-molybdenum mixed oxide showed good cycling stability at a 3 A/g charge/discharge rate when the molar ratio of Mo/Fe was in the range of about 9/1 to 1/3. The range can be extended if a structural additive is incorporated or the charge/discharge rate is reduced.

In various embodiments, the present invention features the preparation and compositions of nanoarchitectured multi-component materials based on carbon-coated iron-molybdenum mixed oxide.

Some embodiments comprise compositions and characteristics of nanoarchitectured multi-component materials based on carbon-coated iron-molybdenum mixed oxide. In a carbon-coated iron-molybdenum mixed oxide, the mixed oxide particles may have sizes in the range of from a few nanometers to a few hundred nanometers. For example, the nanoparticles may have sizes in the range from less than about 5 nm to about 500 nm. Preferred particles may have sizes in the range of about 5 nm to about 100 nm. A few particles with sizes greater than 500 nm may exist in the multi-component materials, but will not limit performance. The mixed oxide nanoparticles may be embedded in a carbon matrix or covered with carbon coating. The mixed oxide may be crystalline with a single or mixed crystal structures. In one example, the mixed oxide is a mixture of several oxides. For example, the mixed oxide may be a mixture of $Fe_2Mo_3O_8$ and $Fe_3O_4$. In one example, the mixed oxide is a multi-component oxide with one single crystal phase. For example, the mixed oxide may have one crystal structure of $Fe_2Mo_3O_8$. In one example, the mixed oxide may be a Fe-doped $MoO_2$ showing one crystal structure from $MoO_2$ or Mo-doped $Fe_3O_4$ showing one crystal structure from $Fe_3O_4$. The oxidation states of Fe and Mo in the multi-component materials may comprise reduced oxidation states (+2 for Fe and +4 for Mo). The oxidations states may become saturated (+3 for Fe and +6 for Mo) if the materials are treated in air at an elevated temperature (for example 300° C.) or stored for long enough time in air at any temperature.

In a carbon-coated iron-molybdenum oxide, the carbon forms a continuous layer covering the oxide particles completely or partially. The carbon may be amorphous or comprise crystallinity. The crystallinity could be realized by heating the amorphous carbon at high temperature or/and using an organic compound with aromatic rings as the carbon source. The carbon content was typically in the range of about 10 wt % to about 35 wt % in a carbon-coated mixed oxide. The carbon content could be in a broader range without sacrificing the cycling stability of the carbon-coated iron-molybdenum mixed oxide. For example, the carbon content could be in the range of about 1 wt % to about 10 wt % with a reduced amount of introduced organic compound and the incorporation of a structural additive. The carbon content could be greater than 35 wt % by introducing additional carbon source to form the carbon coating.

In some embodiments, the multi-component materials may comprise at least one nano-structured structural additive. The structural additive acts an additive to help release the volume change stress generated by the mixed oxide nanoparticles in the electrode film, so that the integrity of the film structure could be maintained. The structural additive could be any nanostructured material that has insignificant volume change during the cycling process. Such material may comprise electro-active materials and electro-inert materials. The electro-active materials may comprise amorphous carbon, graphite, carbon nanoparticles, carbon nanocrystals, carbon nanohorns, carbon black, activated carbon, carbon fibers, carbon nanotubes, and graphene. Electro-inert materials may comprise $Al_2O_3$, $SiO_2$, and a polymer such as conductive polymer. Nanoparticles from transition metals (Cu, Ni, Ti for example) and aluminum may also be used as an electro-inert additive as long as the lithium insertion/extraction reaction to the transition metal or aluminum is negligible. It is possible that a polymer including a conductive polymer may be used as the structural additive. With the incorporation of a structural additive, the carbon content and the Mo/Fe molar ratio in a carbon-coated mixed oxide could be in a broader range without a reduction in cycling stability. The content of a structural additive could be in the range from less than 1 wt % to greater than 90 wt %. A narrower range of about 1 wt % to about 50 wt % is preferred depending on the requirements for the multi-component material, which may include the requirements for its electrochemical performance and production cost.

In at least one embodiment, the nanoarchitectured multi-component materials may comprise at least one nano-structured conductive additive. The conductive additive is a material that has relatively good electric conductivity (better than the mixed oxide for example) and good cycling stability during cycling. The conductive additive may include carbonaceous materials comprising amorphous carbon, graphite, carbon nanoparticles, carbon nanocrystals, carbon nanohorns, carbon black, activated carbon, carbon fibers, carbon nanotubes, and graphene. The conductive additive may also include metal nanoparticles such as metals from transition metals (copper, nickel, titanium for example), aluminum, and conductive polymer.

At least one embodiment comprises a preparation method for the nanoarchitectured multi-component material based on carbon-coated iron-molybdenum mixed oxide. The method involves the reaction mechanism of a sol-gel process. By way of example, an organic base is used as a mild base to induce the hydrolysis and condensation reactions of the metal ions. The organic base not only acts as a weak base to induce the gel or colloids formation, but also provides a carbon source for the carbon-coated multi-component material and forms a carbon barrier layer to limit the particle growth during the heating process.

A detailed discussion of the sol-gel process is presented here, by way of non-limiting examples, to identify some advantages of this process. In one example, metal salts are dissolved in a solvent. The metal salt containing molybdenum may be selected from molybdenum chloride. The metal salt containing iron may be selected from iron chloride, iron nitrate, iron sulfate, iron carbonate, and iron acetate. Metal salts containing aluminum may be selected from a group comprising aluminum nitrate, aluminum sulfate, aluminum acetate, and aluminum chloride. Metal salts containing silicon may include silicon chloride and silicon alkoxides. The solvent may be selected from water, ethanol, methanol, propanol, acetone, and a combination thereof. An acid such as HCl may be added into the solution to dissolve the salts.

After dissolving the metal salts, an organic compound that acts as an additional source of carbon coating may be dissolved in the solution. The organic compound could be any hydrocarbon that can dissolve in the solution and decompose into carbon during the carbonization process. Suitable organic compounds may include sucrose, glucose, and a polymer such as polyethylene amine At least one additive that is not soluble in the solution may be dispersed in the solution. The additive may be a structural additive to increase the cycling stability or a conductive additive to increase the electrical conductivity of the multi-component material. The additive may be selected from a group comprising carbonaceous materials and metal nanoparticles. The carbonaceous material may include carbon nanotubes, carbon fibers, graphene, carbon black, and graphite. The metal may include nickel, copper, aluminum, titanium, and iron.

An organic base is then added into the dispersion to induce the hydrolysis and condensation of the metal ions. The organic base is an organic compound that may raise the pH value of the solution after it is dissolved. It may be selected from propylene oxide and pyridine.

After adding the organic base, a gel may be formed. In some embodiments the formed gel will be dried at 80° C. for about 12 hours. However, the drying temperature and time may be varied as needed. In the case that a gel is not preferred particularly for continuous production, the formation of gel may be avoided by using diluted reactants. A homogeneous colloidal solution may be obtained by using diluted reactants. The solution may be dried by a variety of processes to obtain a solid product. For example, a spray-drying process may be used to dry the diluted solution and the solvent may be recycled.

The dried product may be heated either in air or in an inert gas environment to remove any physically or chemically bonded water and to decompose the coated hydrocarbon molecules. The temperature will be less than about 500° C. if the material is heated in air because higher temperature will be likely to burn off all carbons, which will reduce the cycling stability of the material. The temperature will be in a broader range if the material is heated in an inert gas environment. For example, the material may be heated to between 450° C. to over 850° C. in Argon. The inert gas may be selected from a group consisting nitrogen, argon, helium, and a combination thereof.

By way of example, a basic operating concept for preparing the present mixed oxide nanoarchitecture from the organic base-assisted sol-gel process is to dissolve precursors for electro-active components (iron-molybdenum mixed oxide for example) and a carbon source (organic base for example) in a solution before the formation of aggregated solid particles. Upon drying, an organic-inorganic hybrid is formed from the solution with intimate contacts between the organic (organic base molecules) and the inorganic (metal hydroxide nano particles). During the thermal treatment process, the nano-sized metal hydroxides are dehydrated and then crystallized to form mixed oxide nano particles with an increase in particle sizes, while the organics become a layer of carbon coating that covers the oxide nano particles and the carbon coating will limit the further growth of the oxide nanoparticles.

Based on this operating concept, other processes may also be used to produce carbon-coated iron-molybdenum nanoparticles. The basic requirement is to obtain an organic-inorganic hybrid homogenously mixed at molecular or nanoscale level before the irreversible formation of particle aggregates. In at least one embodiment, the inorganic comprises metal ions. In at least one embodiment, the inorganic comprises well-dispersed nano particles. In at least one embodiment, the inorganic comprises nano colloids. The colloids may be amorphous or crystalline. In at least one embodiment, an organic acid such as citric acid may be used to form metal ion-citric acid complexes as the organic-inorganic hybrid. The complexes are then dried as a gel-like product and heated at relatively high temperature (above 450° C. for example) in an inert environment to obtain carbon-coated mixed oxide nanoparticles. In at least one embodiment, an organic-inorganic hybrid comprises metal ion-organics complexes, where the organics comprise at least one functional group such as —NH, —$NH_2$, —SH, —PO, —COOH that can form complexes with metal ions. In at least one embodiment, an organic compound that does not induce gel formation can be dissolved in a solution comprising ammonium molybdate and iron nitrate. A gel will be formed upon heating at about 80° C. with the organic molecules trapped in the network of inorganic nano colloids. The gel will be dried and then sintered at high temperature to obtain carbon-coated iron-molybdenum mixed oxides. The organic compound comprises those organics that do not induce gel formation under any experimental conditions and those organics that may induce gel formation under certain experimental conditions, but not under the conditions for the preparation of iron-molybdenum mixed oxide. In at least one embodiment, an organometallic compound or a mixture of organometallic compounds containing both iron and molybdenum are thermally decomposed into carbon-coated mixed metal oxide. In at least one embodiment, an organic-inorganic hybrid is formed by dispersing metal precursors in a polymer. Carbon-coated metal oxides will be obtained after a thermal treatment of the hybrid. In at least one embodiment, an organic-inorganic hybrid is formed by coating pre-formed well-dispersed inorganic nano colloids with organics. The coating may be realized by chemical or electrostatic adsorption of the organic molecules onto the nano colloids. The formed hybrid could be used to generate a carbon-coated mixed oxide.

Some embodiments comprise fabrication of an energy storage device based on the nanoarchitectured multi-component material. In one example, an asymmetric capacitor may be fabricated with the multi-component material as the negative electrode material and a porous carbon as the positive electrode material. In this device, the porous carbon may include any carbonaceous material with high surface area. The surface area may be in the range of about 1500 $m^2/g$ to over 3000 $m^2/g$. The surface area may also be in the range of about 500 $m^2/g$ to about 1500 $m^2/g$. The surface area may further be in the range of about 1 $m^2/g$ to about 500 $m^2/g$. The porous carbon may be selected from activated carbon, carbon black, carbon nanotubes, graphene, carbon nanoparticles, carbon nanofibers, carbon nanohorns, and a combination thereof.

In another example, an energy storage device may be fabricated by using the multi-component material as the positive electrode material and an element or a compound as the negative electrode material. The negative electrode material may be selected from lithium, silicon, silicon monoxide, carbonaceous material, tin, antimony, tin oxide, metal nitrides, and a combination thereof. The carbon-coated iron-molybdenum multi-component material may be doped with lithium ions as the positive electrode material.

As a further example, an energy storage device may be fabricated by using the carbon-coated iron-molybdenum multi-component material as the negative electrode material with an organic electrolyte. The positive electrode may comprise a material selected from a group comprising $LiFePO_4$, $LiMn_2O_4$, $LiCoO_2$, $LiNiO_2$, $VOPO_4$, sulfur, selenium, and a combination thereof. The positive electrode may comprise an air electrode that catalyzes the oxygen evolution and reduction reactions. The positive electrode may also comprise a catalyst that may catalyze the redox reactions of iodine and bromine. The multi-component material may also be used as an electrode material for an energy storage device with an aqueous electrolyte.

Some additional features, properties, and advantages of the present carbon-coated iron-molybdenum multi-component materials are further disclosed in the following examples.

EXAMPLES

Example 1

Preparation and Electrochemical Study of Nanoarchitectured Carbon-Coated Iron-Molybdenum Mixed Oxide and Carbon-Free Iron-Molybdenum Mixed Oxide Carbon-coated and carbon-free iron molybdenum mixed oxides were prepared from the organic base-assisted sol-gel process. In one typical process, $MoCl_5$ and $Fe(NO_3)_3$ with a specific Mo/Fe molar ratio (3/2) were dissolved in a mixture of ethanol and water to form a clear solution. Propylene oxide was added as the organic base to hydrolyze and condense the metal ions. A gel was formed within minutes. The gel was dried at 80° C. overnight. A carbon-coated iron-molybdenum mixed oxide was obtained by heating the dried gel at 750° C. in Argon for 4 hours. The corresponding carbon-free iron-molybdenum mixed oxide was obtained by further heating the carbon-coated sample at 550° C. in air for 4 hours. The material heated in Argon appeared to be black, while the material heated in air had brownish color, suggesting that carbon has been removed by heating the material in air at 550° C.

Carbon content of the carbon-coated and the carbon-free samples were studied by Energy-dispersive X-ray spectroscopy. EDX spectra revealed that the carbon content was about 10 wt % for the carbon-coated sample, while the carbon content for the sample heated in 550° C. air (carbon-free sample) was negligible.

FIG. 1a shows the X-ray diffraction (XRD) pattern for $Fe_2Mo_3O_x$ materials before and after removing the carbon content. The chemical formula of $Fe_2Mo_3O_x$ here only means that the material is an oxide with Fe/Mo molar ratio of 2/3. It does not necessarily suggest that the oxide has a single crystal phase. It may be a mixture of oxides with several crystal phases. The material heated at 750° C. in Argon can be identified as single-phased $Fe_2Mo_3O_8$ (JCPDS number: 01-074-1429), where the oxidation state for Fe is +2 and the oxidation state for Mo is +4. Both Fe and Mo are in reduced states, which is likely due to the carbonization process during heating. The initial oxidation states of Fe and Mo are +3 and +5, respectively. During the heating process, decomposing hydrocarbon and/or carbon will consume oxygen molecules from the mixed oxides to become CO, $CO_2$, and water. After heating in air, the metal oxides in reduced oxidation states are oxidized by oxygen in air to become a pure crystal phase of $Fe_2Mo_3O_{12}$ (JCPDS: 01-083-1701), where the oxidation state is +3 for Fe and +6 for Mo, respectively.

The two materials were tested for electrochemical performance. For electrochemical study, a two-electrode flat cell was used as the testing device. Half cells were made by using a piece of lithium metal as the negative electrode, a glass fiber membrane as the separator, and a film containing the multi-component material coated on copper foil as the positive electrode. The positive electrode coating comprised 80 wt % of the multi-component material, 16 wt % of acetylene black, and 4 wt % of PVDF. The electrolyte was 1 M $LiPF_6$ in EC/DEC (1/1 volume ratio). Data of constant current charge/discharge cycles were collected from a Solartron SI 1286 Electrochemical Interface. With a constant charge/discharge rate of 3 A/g, all half cells were continuously cycled between 0.02 to 3.0 V vs. $Li/Li^+$ for 50 cycles. Specific capacity was calculated based on the total mass of the electrode material which included acetylene black and the polymer binder. Unless specified, all materials in utilized in the examples were tested with the same conditions described in this section.

The cycling stabilities for the two materials are shown in FIG. 1b. The capacity for the carbon-free material decreased continuously, while no reduction in capacity was observed for carbon-coated material for at least 50 cycles. Similar comparison has been made to carbon-coated and carbon-free iron-molybdenum mixed oxide materials heated at 550° C. The carbon-coated material showed stable cycling performance, while the carbon-free material had poor cycling performance. The comparison shows that the existence of carbon provides the mixed oxide with stable cycling performance for the iron-molybdenum mixed oxide discussed in this invention.

Example 2

Preparation, Characterizations, and Electrochemical Study of Carbon-Coated Iron-Molybdenum Multi-Component Materials with Various Mo/Fe Molar Ratios $MoCl_5$ and $Fe(NO_3)_3$ with a specific Mo/Fe molar ratio were dissolved in ethanol to form a clear solution. Water may be added as needed to provide enough water for hydrolysis. Propylene oxide was added afterward to hydrolyze and condense the metal ions. Gels may be formed within minutes, or no gel may be formed without heating depending on the molar ratios of Mo/Fe. All samples were heated at 80° C. overnight. The dried gel-like products were finally heated at 550° C. in nitrogen or argon for 4 hours.

Figure 2:
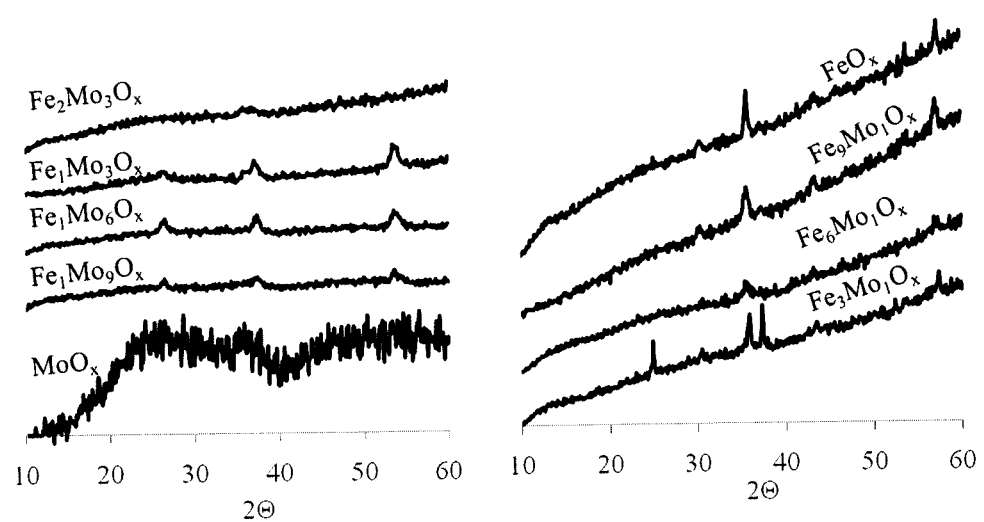
FIG. 2 illustrates XRD patterns for $MoO_x$, $Fe_1Mo_9O_x$, $Fe_1Mo_6O_x$, $Fe_1Mo_3O_x$, $Fe_2Mo_3O_x$, $Fe_3Mo_1O_x$, $Fe_6Mo_1O_x$, $Fe_9Mo_1O_x$, and $FeO_x$.

FIG. 2 shows the XRD patterns for the materials with various Mo/Fe ratios. A symbol $O_x$ is used for all materials to indicate these materials may contain oxygen. The oxygen percentage, however, may not be fixed for each material. For example, $MoO_x$ means that the material is molybdenum oxide. The value of x may range from near 0 to 3 depending on the processing and storage conditions. The value of x in other materials may have a different range than in $MoO_x$ depending on the properties of the materials. The XRD pattern for $MoO_x$ may show three broad peaks, suggesting the average crystal size for this material is very small (likely to be several nanometers). From the peak positions, the material could be identified as $MoO_2$ (JCPDS number: 00-032-0671). Same as $MoO_x$, $Fe_1Mo_9O_x$, $Fe_1Mo_6O_x$, and $Fe_1Mo_3O_x$ could also be indexed as $MoO_2$ (JCPDS number: 00-032-0671). $Fe_2Mo_3O_x$ may be indexed as $Fe_2Mo_3O_8$ (JCPDS number: 00-036-0526). $Fe_3Mo_1O_x$ may be indexed as a mixture of $Fe_2Mo_3O_8$ (JCPDS number: 00-036-0526) and $Fe_3O_4$ (JCPDS number: 00-019-0629). $Fe_6Mo_1O_x$, $Fe_9Mo_1O_x$, and $FeO_x$ may be indexed as magnetite ($Fe_3O_4$, JCPDS number: 00-019-0629).

EDX spectra (not shown) confirmed the existence of carbon in all materials. A typical carbon loading may be greater than about 10 wt % to about 30 wt %. In some of the materials, chlorine was identified from EDX, which is likely to come from iron chloride salt since there was no washing step in the preparation process to remove the chloride ions.

Figure 3:
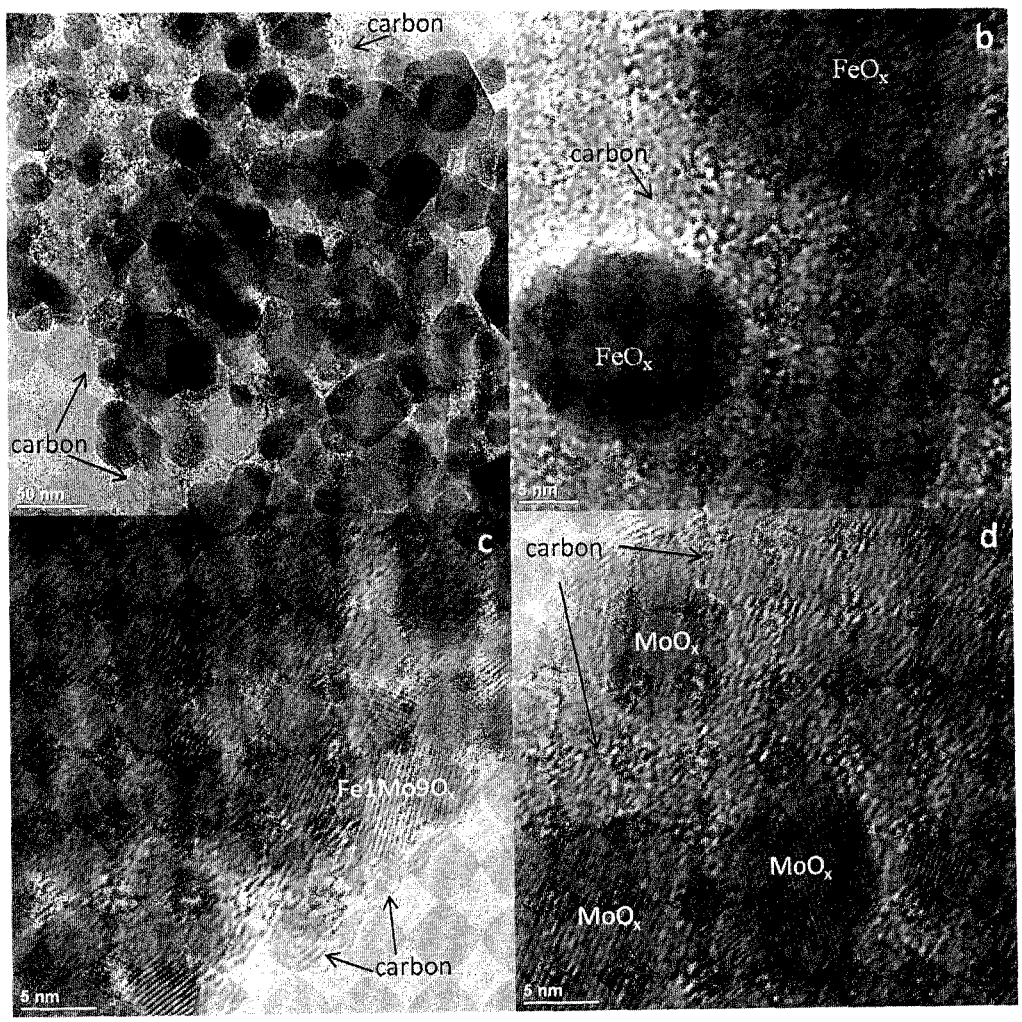
FIG. 3 illustrates representative TEM images for carbon-coated $FeO_x$, $Fe_1Mo_9O_x$, and $MoO_x$: (a) low resolution image for $FeO_x$; (b) high resolution image for $FeO_x$; (c) high resolution image for $Fe_1Mo_9O_x$; and (d) high resolution image for $MoO_x$.

Transmission Electron Microscope (TEM) images were collected for selected materials with Mo/Fe molar ratios of 1/0, 9/1, 3/2, and 0/1. TEM images further confirmed the existence of carbon in the materials. FIG. 3 shows the representative images collected for $FeO_x$, $Fe_1Mo_9O_x$, and $MoO_x$. Representative oxide particles are nanoscaled with particle sizes in the range of several nanometers to tens of nanometers. Representative images show that these nanoparticles are surrounded by amorphous carbons.

Figure 4:
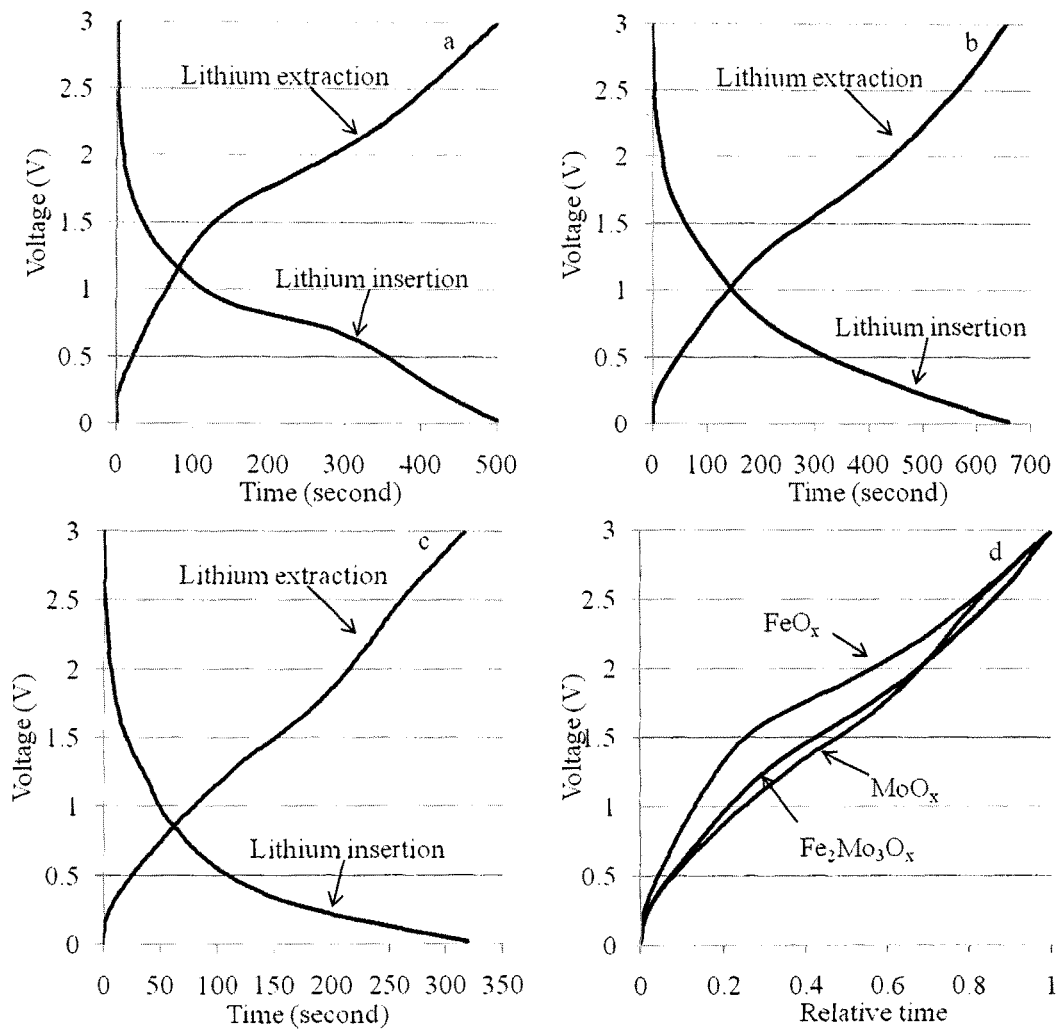
FIG. 4 illustrates constant current charge/discharge curves for: (a) $FeO_x$, (b) $Fe_2Mo_3O_x$, and (c) $MoO_x$ at 3 A/g charge/discharge rate. The extraction curves are compared in (d).

Carbon-coated materials with various Mo/Fe ratios were tested for electrochemical performance FIG. 4 shows the constant charge/discharge curves for $FeO_x$, $Fe_2Mo_3O_x$, and $MoO_x$. When used as a negative electrode material, the shape of the lithium extraction curve may affect the operating voltage of a full device. The lithium extraction curve for $FeO_x$ has a relatively flat slope after ~1.6 V. For comparison, the slope is much sharper for $MoO_x$ and $Fe_2Mo_3O_x$ in this region, which is preferred for higher output device voltage. A comparison of the lithium extraction curves among the three samples (FIG. 4d) shows that the voltage increased much faster for $FeO_x$ at a low voltage region (<~1.6 V vs. Li/Li$^+$) and then increased much slower at a middle voltage region (~1.6 V to ~2.5 V vs. Li/Li$^+$). The lithium extraction curve for $Fe_2Mo_3O_x$ is similar to that for $MoO_x$, which is preferred over $FeO_x$ for higher output voltage in a full device. If $FeO_x$ is used as the negative electrode material in a full cell, it means that the cell voltage drops faster at the beginning and then becomes more stable after the negative electrode reaches the middle voltage region. The cell output voltage will be smaller with $FeO_x$ than that with $MoO_x$ or $Fe_2Mo_3O_x$ if they are used as the negative electrode materials.

Figure 5:
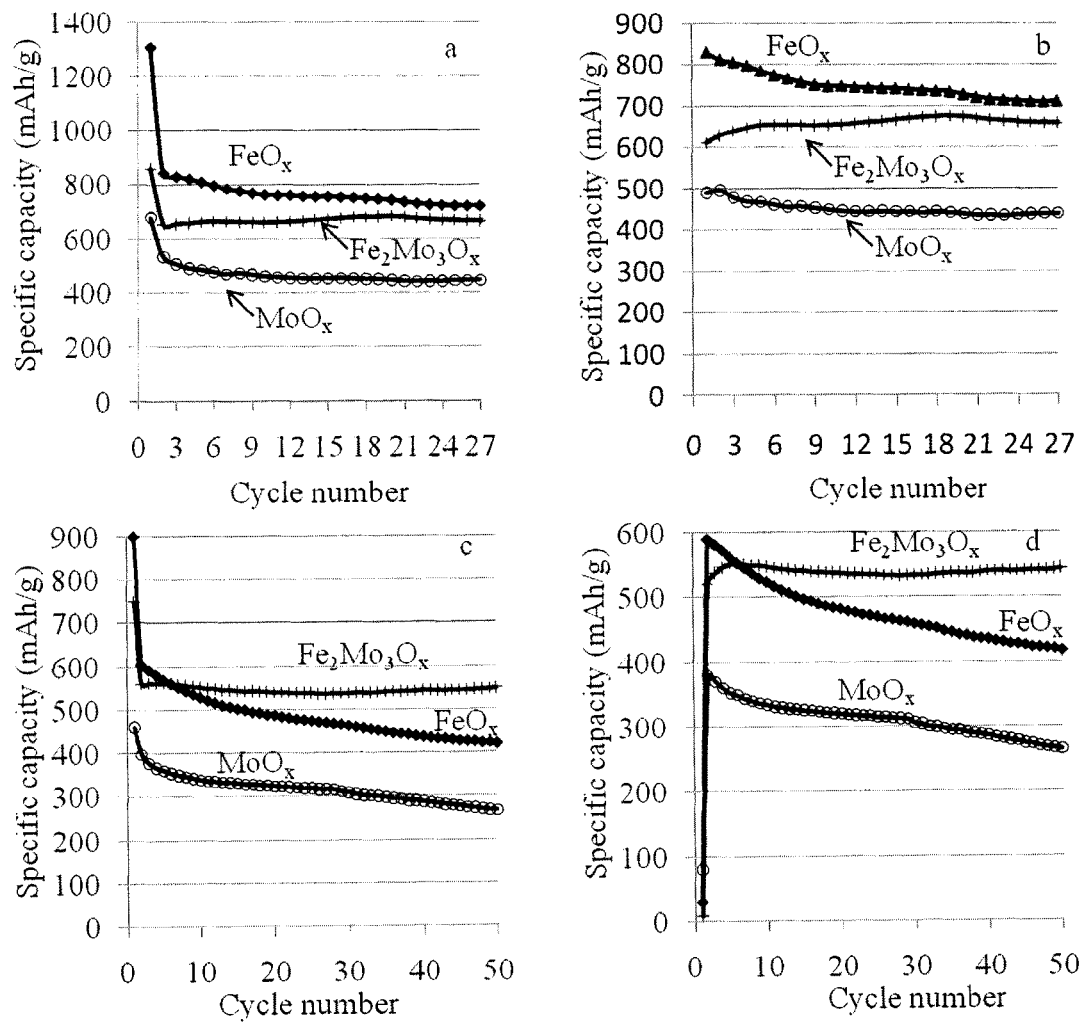
FIG. 5 illustrates a comparison of electrochemical performance among $FeO_x$, $MoO_x$, and $Fe_2Mo_3O_x$ at 1 A/g and 3 A/g charge/discharge rates: (a) cycling stability of lithium extraction process at 1 A/g; (b) cycling stability of lithium insertion process at 1 A/g; (c) cycling stability of lithium extraction process at 3 A/g; and (d) cycling stability of lithium insertion process at 3 A/g.
Figure 6:
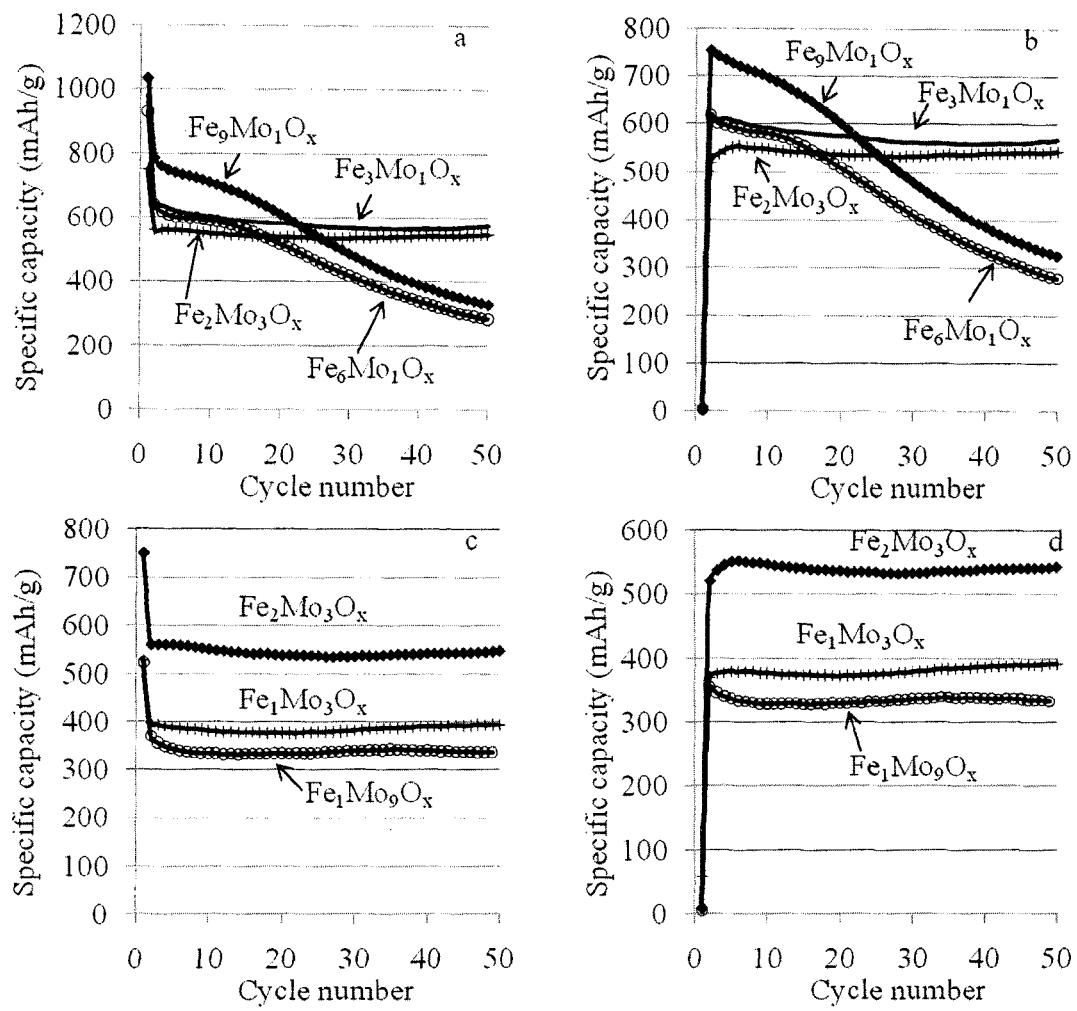
FIG. 6 illustrates a comparison of electrochemical performance among $Fe_1Mo_9O_x$, $Fe_1Mo_3O_x$, $Fe_2Mo_3O_x$, $Fe_3Mo_1O_x$, $Fe_6Mo_1O_x$, $Fe_9Mo_1O_x$ at 3 A/g charge/discharge rate: (a) cycling stability of lithium extraction process for $Fe_1Mo_9O_x$, $Fe_1Mo_3O_x$, $Fe_2Mo_3O_x$; (b) cycling stability of lithium insertion process for $Fe_1Mo_9O_x$, $Fe_1Mo_3O_x$, $Fe_2Mo_3O_x$; (c) cycling stability of lithium extraction process for $Fe_2Mo_3O_x$, $Fe_3Mo_1O_x$, and $Fe_9Mo_1O_x$; and (d) cycling stability of lithium insertion process for $Fe_2Mo_3O_x$, $Fe_3Mo_1O_x$, and $Fe_9Mo_1O_x$.

FIGS. 5 and 6 show the comparison of the cycling stability among all materials with various Mo/Fe ratios. The mixed oxide showed better cycling stability when the Mo/Fe ratio was larger than 1/3. Too much iron in the multi-component materials ($Fe_6Mo_1O_x$ and $Fe_9Mo_1O_x$) seriously deteriorated the cycling stability. The poor cycling stability for $FeO_x$, $Fe_9Mo_1O_x$, $Fe_6Mo_1O_x$, shows that iron oxide may have experienced a much larger volume change than $MoO_x$ during the cycling process. For comparison, materials with larger percentage of Mo have shown much better cycling stability. It is interesting to point out that the pure $MoO_x$ also lacks good cycling stability at higher charge/discharge rate (3 A/g). The reason for the stability difference between $MoO_x$ and $Fe_1Mo_9O_x$ is not clear. A reasonable explanation is that iron oxide may also act as a stress buffer layer for molybdenum oxide so that the volume change becomes more smooth for the mixed oxide.

Interestingly, the specific capacity of the mixed oxide generally increased with an increase of Fe/Mo molar ratio. Theoretical specific capacities for $Fe_2O_3$ (1007 mAh/g) and $MoO_3$ (1117 mAh/g) are similar. The increase in capacity suggests that iron oxide has improved the rate capability of molybdenum oxide.

All materials in this section coated carbon that was produced from a similar process. The difference in cycling stability suggests that not only carbon, but also the molar ratio of Mo/Fe could affect the cycling stability of the iron-molybdenum mixed oxide.

Carbon-coated mixed oxides such as $MnMoO_x$ and $SnMoO_x$ were also prepared under similar conditions as $Fe_2Mo_3O_x$. These materials, however, showed poor cycling stability at 3 A/g, suggesting that the unique combination between iron and molybdenum has resulted in the good cycling stability of the mixed oxides in the present invention.

Compared to reported values, mixed oxides in this invention showed high specific capacities. For example, the specific capacity for $Fe_3Mo_1O_x$ was about 550 mAh/g based on the mass of the total electrode material or about 680 mAh/g based on the weight of the multi-component material after stabilization. This value is much higher than the reported capacity (~400 mAh/g) for carbon coated $MoO_2$, which was charged/discharged at an even slower rate (3 C or 2.5 A/g, Wang et al.).

Example 3

Preparation and Electrochemical Study of Carbon-Coated Lithium-Iron-Molybdenum Mixed Oxide Multi-Component Material from a Citric Acid-Assisted Sol-Gel Process This experiment shows that stable carbon-coated iron-molybdenum multi-component materials could be prepared by other sol-gel processes by using the same operation concept for the organic base-assisted sol-gel process. It also demonstrates that an alkaline metal such as lithium can be incorporated into the mixed oxide without reducing its cycling stability.

In this experiment, a carbon-coated lithium-iron-molybdenum mixed oxide was prepared from an organic acid-assisted sol-gel process. In one typical experiment, lithium nitrate, molybdenum chloride, iron (III) nitrate, and citric acid were dissolved in water. The solution was then dried at 80° C. for about 12 hours. The obtained gel-like solid was heated at 550° C. for 4 hours in Argon. A black solid was produced after the heating treatment. Existence of carbon was confirmed with EDX in the black solid.

Figure 7:
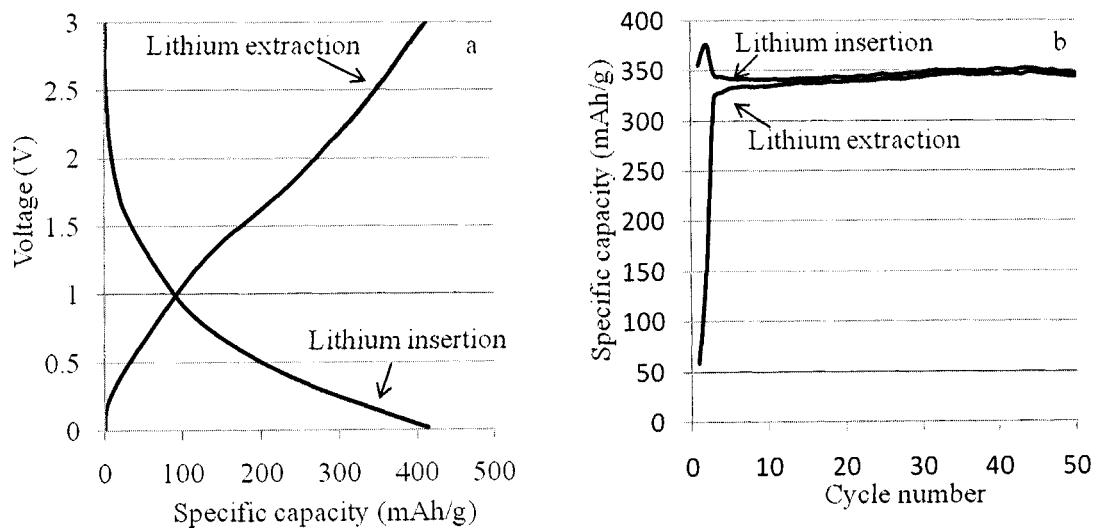
FIG. 7 illustrates electrochemical performance for $Li_3Fe(MoO_x)_3$ prepared from citric acid-assisted sol-gel process at 3 A/g charge/discharge rate.

A two-electrode flat cell with lithium as the negative electrode and the present carbon-coated iron-molybdenum multi-component material was made and tested as discussed in Example 1. Electrochemical performance for the material is shown in FIG. 7. The lithium extraction curve for the material is close to linear, which is similar to the shape for $Fe_2Mo_3O_x$, prepared from an organic base-assisted sol-gel process (FIG. 4b). The similarity shows that the carbon generated from various sources may not affect the electrochemical reaction mechanism of the iron-molybdenum mixed oxide. The material showed good cycling stability for at least 50 cycles at 3 A/g charge/discharge rate, confirming that the citric acid-assisted sol-gel process could be used to prepare a nanoarchitectured electrode material with good cycling stability.

Example 4

Preparation and Electrochemical Study of Carbon Nanotube-Incorporated Iron-Molybdenum Multi-Component Material Conductive carbons such as carbon nanotubes and graphene are known to have excellent electric conductivity and stable electrochemical performance. These nanostructured carbons may be used as an additive to tune the rate capability and cycling stability of the present carbon-coated iron-molybdenum oxides.

Figure 8:
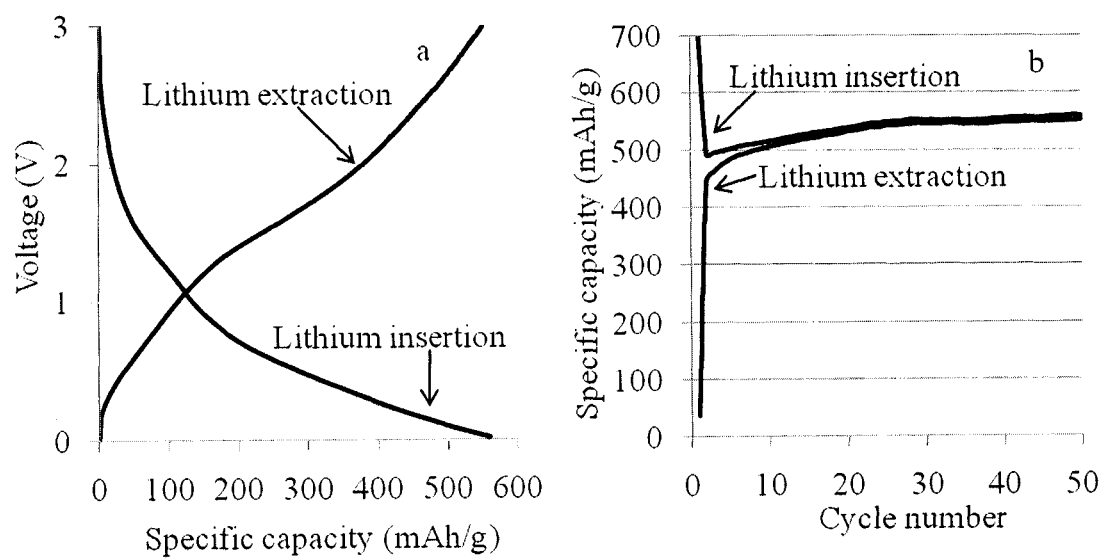
FIG. 8 illustrates electrochemical performance for $Fe_2Mo_3O_x$/MWCNTs at 3 A/g charge/discharge rate: (a) representative constant charge/discharge curves and (b) cycling stability.

In this experiment, about 20 wt % multi-wall carbon nanotubes (MWCNTs) were incorporated into a multi-component material during the synthesis. After dissolving all metal salts, a specific amount of MWCNTs were dispersed in the solution by ultrasonication. Propylene oxide was then added into the dispersion to induce the gelation. The obtained gel was finally dried in air and heated in Argon as described in Example 1. The MWCNT-incorporated multi-component material has shown good cycling stability and high specific capacity (FIG. 8). The specific capacity of the electrode material was about 550 mAh/g. The contribution from the carbon-coated iron-molybdenum mixed oxide may be about 780 mAh/g by reasonably assuming that the specific capacity for the MWCNTs was about 300 mAh/g at 3 A/g. For comparison, the contribution from the carbon-coated iron-molybdenum mixed oxide was about 680 mAh/g at 3 A/g. See FIG. 6b. This shows that the utilization of the mixed oxide has been increased after incorporating MWCNTs. It also shows that conductive additives could be incorporated well into the carbon-coated iron-molybdenum multi-component materials without deteriorating the cycling stability or capacity.

Example 5

Preparation and Electrochemical Study of Carbon-Coated Iron-Molybdenum-Carbon Nanotube Multi-Component Material with an Additional Carbon Source The carbon source provided by an organic base may be limited. A carbon source other than the organic base can be purposely added into the reactants solution to provide an additional carbon source for the oxides so that a high carbon loading may be achievable.

Figure 9:
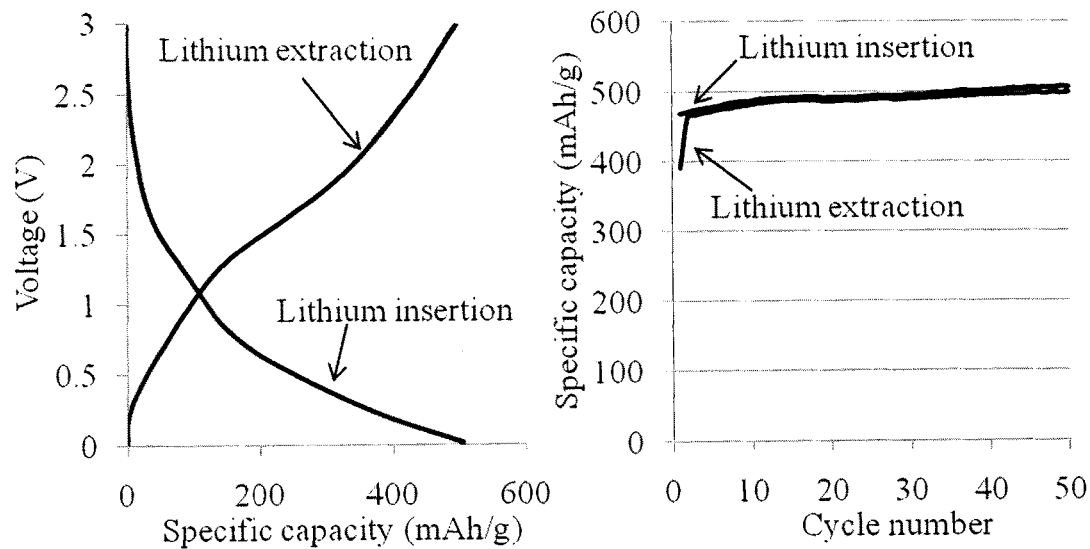
FIG. 9 illustrates electrochemical performance for $Fe_2Mo_3O_x$/MWCNTs/carbon at 3 A/g charge/discharge rate: (a) representative constant charge/discharge curves and (b) cycling stability.
Figure 10:
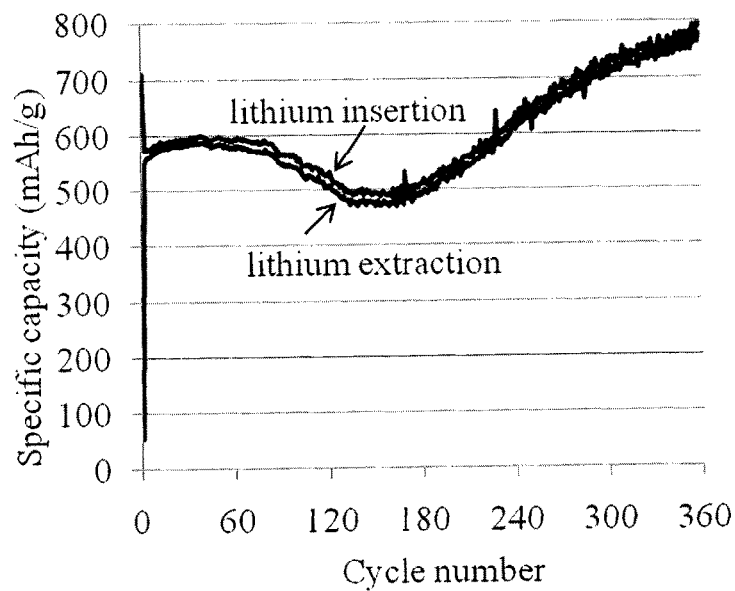
FIG. 10 illustrates electrochemical performance for $Fe_2Mo_3O_x$/MWCNTs/carbon coating at 0.1 A/g charge/discharge rate.

In this experiment, additional carbon was incorporated by introducing sucrose into the reactant solution. The obtained product again has shown good cycling stability and high specific capacity (FIG. 9). The specific capacity is around 500 mAh/g at 3 A/g charge/discharge rate for the electrode material that contains 20 wt % of electro-inactive additives. The material was also charged/discharged at relatively slow rate (100 mA/g) in a coin cell with lithium as the negative electrode. It was continuously charged/discharged for at least 6 months. The material shows good stability over 360 cycles (FIG. 10). The specific capacity of the electrode material can reach over 750 mAh/g at the $360^{th}$ cycle. The specific capacity for the multi-component material actually is over 935 mAh/g since 20 wt % of the electrode material is not electro-active (carbon black and polymer binder). This is a very high capacity among all reported values for negative electrode materials.

Example 6

Preparation and Electrochemical Study of Aluminum Oxide Doped Iron-Molybdenum Multi-Component Materials The main reason for the lack of good cycling stability is the large volume contraction/expansion during cycling for a negative electrode material. To restrict the volume change impact, it will be beneficial to incorporate an electro-inert component into the multi-component material. The electro-inert component will help to release the generated stress and maintain the integral structure of the electrode film.

Figure 11:
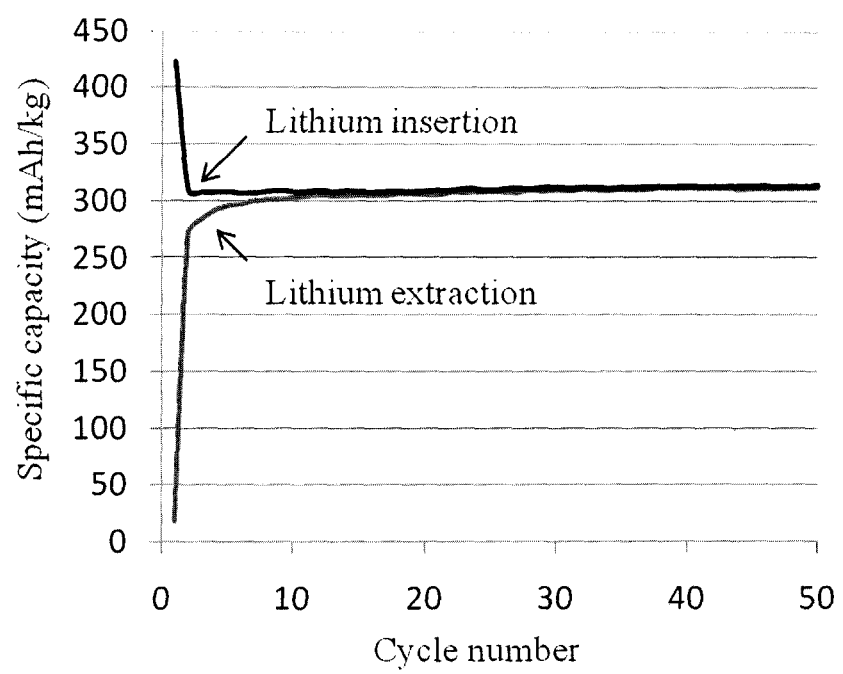
FIG. 11 illustrates electrochemical performance for $Al_{0.2}(Fe_2Mo_3)_{0.8}O_x$ at 4 A/g charge/discharge rate.

An aluminum oxide-doped multi-component material was prepared by following the typical procedure described in Example 1 after dissolving $Al(NO_3)_3$ in the solution. A half cell was fabricated by using lithium as the negative electrode. FIG. 11 shows the constant current charge/discharge voltage profile and cycling performance for $Al_{0.2}(Fe_2Mo_3)_{0.8}O_x$ at 4 A/g. The cycling stability plot shows that the aluminum oxide-doped mixed oxide has a stable performance for at least 50 cycles. This is the best cycling stability under 4 A/g as compared to the conventional carbon-coated and un-coated $MoO_3$, $MoO_2$, or $Fe_3O_4$, which demonstrates the uniqueness of the electrode materials discussed in this invention.

Example 7

Fabrication and Electrochemical Testing of an Asymmetric Ultracapacitor

An ultracapacitor was fabricated to demonstrate the feasibility to use the present multi-component materials as the negative electrode material. Better electrochemical performance may be achievable since the demonstrated capacitor has not been optimized for maximum energy or power density.

Figure 12:
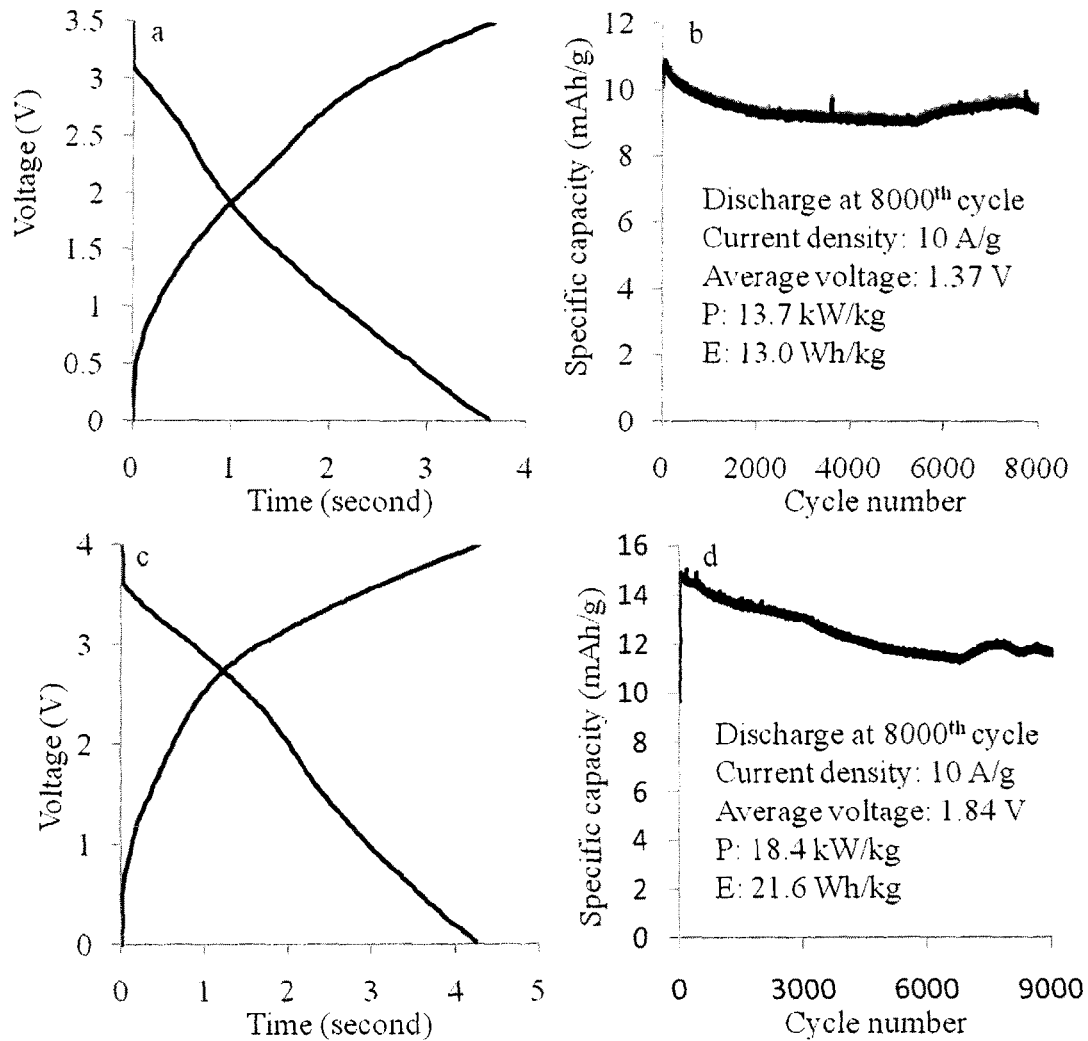
FIG. 12 illustrates electrochemical performance for an asymmetric capacitor using $Al_{0.2}(Fe_2Mo_3)_{0.8}O_x$ as the anode and an activated carbon as the cathode: (a) representative constant charge/discharge curves for the capacitor charged/discharged between 0 V and 3.5 V vs. $Li/Li^+$; (b) cycling stability for the capacitor charged/discharged between 0 V and 3.5 V vs. $Li/Li^+$; (c) representative constant charge/discharge curves for the capacitor charged/discharged between 0 V and 4.0 V vs. $Li/Li^+$; (b) cycling stability for the capacitor charged/discharged between 0 V and 4.0 V vs. $Li/Li^+$.

The capacitor had a negative electrode made of 80 wt % $Al_{0.2}(Fe_2Mo_3)_{0.8}O_x$, 16 wt % acetylene black and 4 wt % PVDF with a copper current collector. The positive electrode coated 45 wt % BP2000 (carbon black), 45 wt % CEP21 (activated carbon), and 10 wt % PVDF. The substrate for the positive electrode was stainless steel. A glass fiber membrane was used as the separator and 1 M $LiPF_6$ in EC/DEC (1/1 volume ratio) was used as the electrolyte. The cell was cycled at first between 0 to 3.5 V and then changed to 0 to 4.0 V at a constant 10 A/g charge/discharge rate. The rate was based on the total weight of materials at both electrodes. The performance data are shown in FIG. 12. The cell shows good cycling stability when it was cycled between 0 to 3.5 V. The cell was not very stable in the first ~7000 cycles when it was cycled between 0 to 4.0 V, but became stable afterwards. Discharge curves from both voltage ranges show a shape similar to that from double-layer capacitors. The voltage drops almost linearly during discharge, which is normal for a capacitor. The power density can be over 13 KW/kg, which is very high among all conventional capacitors, suggesting that the multi-component mixed oxides are promising as the negative electrode material for ultracapacitors.

Thus, the inventors have shown that an electrode material with high specific capacity and stable cycling stability could be prepared by nanoarchitecturing a carbon coating onto iron-molybdenum mixed oxide nanoparticles through a wet-chemistry process and controlling the molar ratios of Fe/Mo. The existence of the carbon coating and a proper Fe/Mo molar ratio (Fe/Mo≤3/1) have been shown to be advantageous for achieving good cycling stability at high rate (3 A/g). The combination of Fe with Mo in the multi-component material might be unique since other carbon-coated mixed oxide such as $MnMoO_x$ or $SnMoO_x$ did not necessarily show good cycling stability even when they were produced under similar conditions.

The electrochemical performance of the carbon-coated iron-molybdenum mixed oxides may be further improved by incorporating a structural additive, which comprises carbon nanotubes, graphene, $Al_2O_3$, and $SiO_2$. With the incorporation of a structural additive, the range of the Fe/Mo molar ratio could possibly be extended to >3/1 since the structural additive will be expected to help release the volume change stress generated by the mixed oxide during the cycling process.

The present carbon-coated iron-molybdenum mixed oxide has shown good high rate performance. Stable cycling performance could be repeatedly obtained at 4 A/g charge/discharge rate, which is much better than the performance for conventional iron-molybdenum mixed oxide.

In summary, the inventors have disclosed an invention wherein at least one embodiment includes a nanoarchitectured multi-component material comprising carbon-coated iron and molybdenum mixed oxide.

Particle sizes for the iron-molybdenum mixed oxide may be less than 1 gm.

Particle sizes for the iron-molybdenum mixed oxide may be in the range from about 5 nm to about 500 nm.

Particles of iron-molybdenum mixed oxide may be dispersed and embedded in a matrix of said coated carbon.

Particles of iron-molybdenum mixed oxides may be covered with carbon partially or completely.

The carbon-coated iron-molybdenum oxide with good cycling stability may have an exemplary Fe/Mo molar ratio in the range of 3/1 to 1/9. A broader range of Fe/Mo is possible by incorporating a structural additive without reducing the cycling stability.

In a nanoarchitectured material, iron and molybdenum comprises a range of oxidation states, which are from reduced oxidation states to saturated oxidation states.

In a carbon-coated iron-molybdenum mixed oxide, iron-molybdenum mixed oxide may have at least one detectable XRD peak.

The carbon in the carbon-coated iron-molybdenum mixed oxide may exist as a coating.

The carbon in the carbon-coated iron-molybdenum oxide may be amorphous and have an irregular or film-like shape.

The carbon in the carbon-coated iron-molybdenum mixed oxide comprises crystallinity.

The carbon may be produced by thermal decomposition of an organic compound such as an organic base, organic acid, polymers, and any hydrocarbon compound.

The carbon content in the carbon-coated iron-molybdenum oxide may be greater than 1 wt %.

The carbon content in the carbon-coated iron-molybdenum oxide may be in the range of about 1 wt % to about 5 wt %.

The carbon content in the carbon-coated iron-molybdenum oxide may be in the range of about 5 wt % to about 35 wt %.

The carbon content in the carbon-coated iron-molybdenum oxide may be greater than 35 wt %.

The nanoarchitectured material comprises lithium.

The nanoarchitectured material comprises a structural additive selected from a group comprising aluminum trioxide, silicon dioxide, carbon nanotubes, carbon fibers, graphene, graphite, carbon black, carbon nanoparticles, metal nanoparticles, and polymers.

The nanoarchitectured material comprises a conductive additive selected from a group comprising carbon nanotubes, carbon fibers, graphene, graphite, carbon black, carbon nanoparticles, metal nanoparticles, and conductive polymers.

The nanoarchitectured material comprises an electroactive additive selected from a group comprising, antimony oxide, tin oxide, bismuth oxide, silicon, and transition metal oxides, excluding iron and molybdenum oxides.

The nanoarchitectured material comprises a phosphate or borate anion.

The nanoarchitectured material comprises a structural additive selected from a group comprising aluminum trioxide, silicon dioxide, carbon nanotubes, carbon fibers, graphene, graphite, carbon black, carbon nanoparticles, metal nanoparticles (metal: Ni, Cu, Ti, Al) and polymers.

The nanoarchitectured material comprises a conductive additive selected from a group comprising carbon nanotubes, carbon fibers, graphene, graphite, carbon black, carbon nanoparticles, metal nanoparticles (metal: Ni, Cu, Ti, Al), and conductive polymers.

The nanoarchitectured material may be prepared from an organic base-assisted sol-gel process.

The organic base may be an organic compound that may generate OH⁻ in a solution.

The organic base comprises propylene oxide, pyridine, and any other organic compound having similar chemical functionalities.

The nanoarchitectured material may be prepared from an organic acid-assisted sol-gel process.

The organic acid comprises at least one carboxylic group.

The organic acid comprises citric acid and fumaric acid.

The nanoarchitectured material may be prepared from a sol-gel process without using any organic gelation agent.

Any organic compound that can be dissolved in the solution may be used as the carbon source in a sol-gel process.

The nanoarchitectured material may be prepared by thermally decomposing an organic-inorganic hybrid that is mixed at molecular or nanoscale level.

The organics comprises a chemical functional group comprising —NH, —NH2, —SH, —OH, —COOH, and —PO.

The inorganics comprises metal ions and inorganic nano colloids.

The nano colloids may be amorphous.

The nano colloids may comprise cyrstallinity.

The carbon source could be dissolved in the reactant solution.

Metal precursor for iron oxide in the mixed oxide comprises iron nitrate, iron chloride, iron sulfate, iron acetate, iron carbonate, iron acetylacetonate, and iron alkoxide.

Metal precursor for molybdenum oxide in the mixed oxide comprises molybdenum (V) chloride and ammonium molybdate.

Metal precursor for $Al_2O_3$ and $SiO_2$ comprises aluminum nitrate, aluminum chloride, aluminum sulfate, aluminum acetate, silicon chloride, and silicon alkoxide.

Metal precursor or lithium oxide comprises lithium nitrate, lithium chloride, lithium sulfate, and lithium acetate.

Metal precursors may be soluble in the reactant solvent.

At least one structural additive may be dispersed/dissolved in the solution.

At least one conductive additive may be dispersed/dissolved in the solution.

The nanoarchitectured material may be prepared from a sol-gel process without any organic gelation agent.

The nanoarchitectured material may be prepared from a process comprising at least one organometallic compound.

The nanoarchitectured material may be prepared from a process comprising a stable colloidal solution.

The nanoarchitectured material may be prepared from a process comprising an organic-inorganic hybrid.

An energy storage device comprises the present nanoarchitectured electrode material.

The energy storage device comprise an alkaline metal ion ($Li^+$, $Na^+$, $K^+$), hydroxide ion ($OH^-$), or hydrogen ion ($H^+$).

The nanoarchitectured material acts as the negative electrode material, while a positive electrode comprises a material storing energy through non-faradic reactions.

The positive electrode material comprises a carbonaceous material.

The carbonaceous material may be selected from a group comprising activated carbon, carbon black, carbon nanotubes, graphenes, carbon nanoparticles, and porous carbon.

The nanoarchitectured material acts as the negative electrode material, while the positive electrode material may provide energy storage through faradic reactions.

The positive electrode material may be selected from a group comprising metal oxides, metal phosphates, metal silicates, metal sulfates, metal borates, carbon fluorides, sulfur, selenium, and polymers.

The nanoarchitectured material acts as the negative electrode material, while the positive electrode material comprises an electrocatalyst that catalyzes the redox reactions for iodine, bromine, and oxygen.

The nanoarchitectured material acts as the positive electrode material, while the negative electrode material comprises a carbonaceous material, silicon, and tin oxide.

The nanoarchitectured material may act as an electrode material for an energy storage device with an aqueous electrolyte.

Thus, while only certain embodiments have been specifically described herein, it will be apparent that numerous modifications may be made thereto without departing from the spirit and scope of the invention. It is a goal of the invention to achieve one or more objects of the invention, although the invention may be practiced without the full achievement of any one of these objects. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A multi-component negative electrode material for an energy storage device, comprising: nanoarchitectured carbon-coated iron-molybdenum mixed oxide $Fe_xMo_yO_z$ having monoclinic or hexagonal crystal structure, wherein said iron-molybdenum mixed oxide has an iron/molybdenum molar ratio in the range from about 1:9 to about 3:1.

2. The nanoarchitectured material of claim 1, wherein said iron-molybdenum mixed oxide has a particle size less than 1 μm.

3. The nanoarchitectured material of claim 1, wherein said iron-molybdenum mixed oxide has a particle size in the range from about 5 nm to about 500 nm.

4. The nanoarchitectured material of claim 1, wherein said coated carbon comprises amorphous carbon with an irregular or film-like shape that forms a coating at the surface of oxide particles.

5. The nanoarchitectured material of claim 1, wherein said coated carbon comprises crystalline structure that forms a coating at the surface of oxide particles.

6. The nanoarchitectured material of claim 1, wherein the particles of said iron-molybdenum mixed oxide are dispersed and embedded in a matrix of said coated carbon.

7. The nanoarchitectured material of claim 1, wherein the content of said coated carbon is greater than 1 wt %.

8. The nanoarchitectured material of claim 1, wherein the content of said coated carbon is in the range from about 5 wt % to about 35 wt %.

9. The nanoarchitectured material of claim 1, wherein iron and molybdenum are in reduced oxidation states.

10. The nanoarchitectured material of claim 1, wherein said iron-molybdenum mixed oxide has at least one detectable XRD peak.

11. The nanoarchitectured material of claim 1, wherein the material comprises lithium.

12. The nanoarchitectured material of claim 1, wherein the material comprises a structural additive selected from a group comprising aluminum trioxide, silicon dioxide, carbon nanotubes, carbon fibers, graphene, graphite, carbon black, carbon nanoparticles, metal nanoparticles, and polymers.

13. The nanoarchitectured material of claim 1, wherein the material comprises an conductive additive selected from a group comprising carbon nanotubes, carbon fibers, graphene, graphite, carbon black, carbon nanoparticles, metal nanoparticles, and conductive polymers.

14. The nanoarchitectured material of claim 1, wherein the material comprises an electro-active component selected from a group comprising, antimony oxide, tin oxide, silicon, and transition metal oxides.

15. An energy storage device comprising a multi-component material comprising nanoarchitectured carbon-coated iron-molybdenum mixed oxide $Fe_xMo_yO_z$ having monoclinic or hexagonal crystal structure as a negative electrode material, wherein said iron-molybdenum mixed oxide has an iron/molybdenum molar ratio of up to 3:1.

16. A multi-component negative electrode material for an energy storage device, comprising: a nanoarchitectured carbon-coated iron-molybdenum mixed oxide material having monoclinic or hexagonal crystal structure wherein the mixed oxide has an iron/molybdenum molar ratio of up to about 3:1 , and has a particle size in the range from about 5 nm to about 500 nm.

17. A multi-component negative electrode material for an energy storage device, comprising: nanoarchitectured carbon-coated iron-molybdenum mixed oxide having monoclinic or hexagonal crystal structure, said mixed oxide comprising a crystal structure of $Fe_xMo_yO_z$, wherein said iron-molybdenun mixed oxide has an iron/molybdenum molar ratio of up to 3:1.

18. The nanoarchitectured material of claim 17, wherein $Fe_xMo_yO_z$ is $Fe_2Mo_3O_8$.

19. A multi-component negative electrode material for an energy storage device, comprising nanoarchitectured carbon-coated $Fe_2Mo_3O_8$.

* * * * *